US011089541B2

United States Patent
Stimpson

(10) Patent No.: US 11,089,541 B2
(45) Date of Patent: Aug. 10, 2021

(54) MANAGING COMMUNICATION SESSIONS WITH RESPECT TO MULTIPLE TRANSPORT MEDIA

(71) Applicant: Sorenson IP Holdings, LLC, Salt Lake City, UT (US)

(72) Inventor: Michael Stimpson, Taylorsville, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 184 days.

(21) Appl. No.: 15/967,183

(22) Filed: Apr. 30, 2018

(65) Prior Publication Data
US 2018/0255509 A1 Sep. 6, 2018

Related U.S. Application Data

(63) Continuation of application No. 15/451,169, filed on Mar. 6, 2017, now Pat. No. 9,967,813.

(51) Int. Cl.
*H04L 29/08* (2006.01)
*H04L 29/06* (2006.01)
(Continued)

(52) U.S. Cl.
CPC ............ *H04W 48/18* (2013.01); *H04L 41/20* (2013.01); *H04W 72/10* (2013.01); *H04L 61/1594* (2013.01)

(58) Field of Classification Search
None
See application file for complete search history.

(56) References Cited

U.S. PATENT DOCUMENTS

| 7,634,269 | B2 * | 12/2009 | Gallagher | H04W 16/16 455/436 |
| 2003/0208601 | A1 | 11/2003 | Campbell et al. | |

(Continued)

FOREIGN PATENT DOCUMENTS

| KR | 20100070597 A | 6/2010 |
| KR | 101101345 B1 | 1/2012 |

(Continued)

OTHER PUBLICATIONS

Combined Search and Examination Report received in Great Britain Application No. 1803248.2, dated Aug. 16, 2018.

(Continued)

*Primary Examiner* — Ajit Patel
(74) *Attorney, Agent, or Firm* — Maschoff Brennan

(57) ABSTRACT

A method may include creating a priority order among two or more transport media based on an availability of each transport medium when a request to establish an outbound communication session is received. The method may further include receiving the request to establish an outbound communication session with a contact and selecting a transport medium of the two or more transport media based on the priority order and one or more user identifications associated with the contact. The method may also include selecting a software controller in response to the selection of the transport medium based on the software controller being associated with the selected transport medium and sending the request to establish the outbound communication session to an electronic device by the selected software controller through the selected transport medium. The method may also include establishing the outbound communication session with the electronic device through the selected transport medium.

20 Claims, 7 Drawing Sheets

(51) Int. Cl.
*H04W 48/18* (2009.01)
*H04L 12/24* (2006.01)
*H04W 72/10* (2009.01)
*H04L 29/12* (2006.01)

(56) References Cited

U.S. PATENT DOCUMENTS

| | | | |
|---|---|---|---|
| 2004/0151285 A1 | 8/2004 | Sychta | |
| 2005/0021872 A1 | 1/2005 | Poustchi et al. | |
| 2005/0135342 A1 | 6/2005 | Kim | |
| 2006/0009201 A1* | 1/2006 | Gallagher | H04W 60/04 455/414.1 |
| 2007/0064682 A1 | 3/2007 | Adams et al. | |
| 2007/0082697 A1 | 4/2007 | Bumiller et al. | |
| 2007/0130302 A1 | 6/2007 | Anderson | |
| 2007/0149182 A1 | 6/2007 | Muratore et al. | |
| 2008/0101224 A1* | 5/2008 | Khasnabish | H04L 43/0817 370/230 |
| 2008/0233978 A1* | 9/2008 | Batey | H04M 1/05 455/41.2 |
| 2009/0067368 A1* | 3/2009 | McAndrews | H04W 48/18 370/328 |
| 2009/0168978 A1 | 7/2009 | Laws et al. | |
| 2009/0175434 A1 | 7/2009 | Becker | |
| 2009/0274286 A1 | 11/2009 | O'Shaughnessy et al. | |
| 2011/0151924 A1* | 6/2011 | Miller | H04L 67/12 455/552.1 |
| 2011/0167182 A1 | 7/2011 | Palin et al. | |
| 2011/0261717 A1* | 10/2011 | Akuzuwa | H04Q 3/66 370/252 |
| 2012/0096095 A1 | 4/2012 | Bhargava | |
| 2012/0229591 A1 | 9/2012 | Lee | |
| 2014/0169363 A1 | 6/2014 | Brorsbol | |
| 2014/0171033 A1 | 6/2014 | Cili et al. | |
| 2014/0280706 A1 | 9/2014 | Jain et al. | |
| 2014/0315524 A1 | 10/2014 | Sinha et al. | |
| 2015/0312408 A1 | 10/2015 | Shi et al. | |
| 2016/0142495 A1 | 5/2016 | Lin et al. | |
| 2016/0156676 A1* | 6/2016 | Verin | H04L 65/1016 709/228 |
| 2016/0261469 A1* | 9/2016 | Breuer | H04L 43/0823 |
| 2016/0345253 A1 | 11/2016 | Tan Bergstrom | |
| 2016/0360445 A1 | 12/2016 | Eason | |
| 2017/0048739 A1 | 2/2017 | Jeong et al. | |
| 2017/0135032 A1 | 5/2017 | Huang et al. | |
| 2017/0208605 A1 | 7/2017 | Ansari et al. | |
| 2017/0353851 A1 | 12/2017 | Gonzalez et al. | |
| 2018/0139660 A1* | 5/2018 | Rommer | H04W 48/18 |
| 2018/0176858 A1* | 6/2018 | Wang | H04W 48/18 |

FOREIGN PATENT DOCUMENTS

| | | |
|---|---|---|
| WO | 2011117656 A1 | 9/2011 |
| WO | 2013054109 A2 | 4/2013 |

OTHER PUBLICATIONS

"RingCentral Movile App Guide", Jan. 2016, 125 pages.
"Virtual Office Mobile, User Guide for iOS", Jan. 2016, 74 pages.
"Google bursts into the wireless industry" website: https://www.cnet.com/news/google-bursts-into-the-wireless-industry-with-project-fi/, retrieved on Mar. 3, 2017, 4 pages.
"Everything you need to know about Wi-Fi calling" website: https://www.cnet.com/news/what-you-need-to-know-about-wifi-calling/, retrieved on Mar. 3, 2017, 5 pages.

* cited by examiner

MANAGING COMMUNICATION SESSIONS WITH RESPECT TO MULTIPLE TRANSPORT MEDIA

CROSS-REFERENCE TO RELATED APPLICATION

This application is a continuation of U.S. patent application Ser. No. 15/451,169, filed on Mar. 6, 2017, the disclosure of which is incorporated herein by reference.

FIELD

The embodiments discussed herein are related to managing communication sessions with respect to multiple transport media.

BACKGROUND

Modern telecommunication services provide a variety of transport media for establishing communication sessions. The transport media may include traditional telephone networks such as a plain old telephone system (POTS), voice over internet protocol systems (VoIP), wireless connectivity systems such as Bluetooth systems, video calling systems, etc.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to establish an outbound communication session is disclosed. The method may include creating a priority order among two or more transport media based on an availability of each transport medium when a request to establish an outbound communication session is received. The method may further include receiving the request to establish an outbound communication session with a contact. The method may also include selecting a transport medium of the two or more transport media based on the priority order and based on one or more user identifications associated with the contact. The method may also include selecting a software controller in response to the selection of the transport medium based on the software controller being associated with the selected transport medium. The method may further include sending the request to establish the outbound communication session with the contact to an electronic device of the contact by the selected software controller through the selected transport medium. The method may also include establishing the outbound communication session by the selected software controller with the electronic device of the contact through the selected transport medium.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
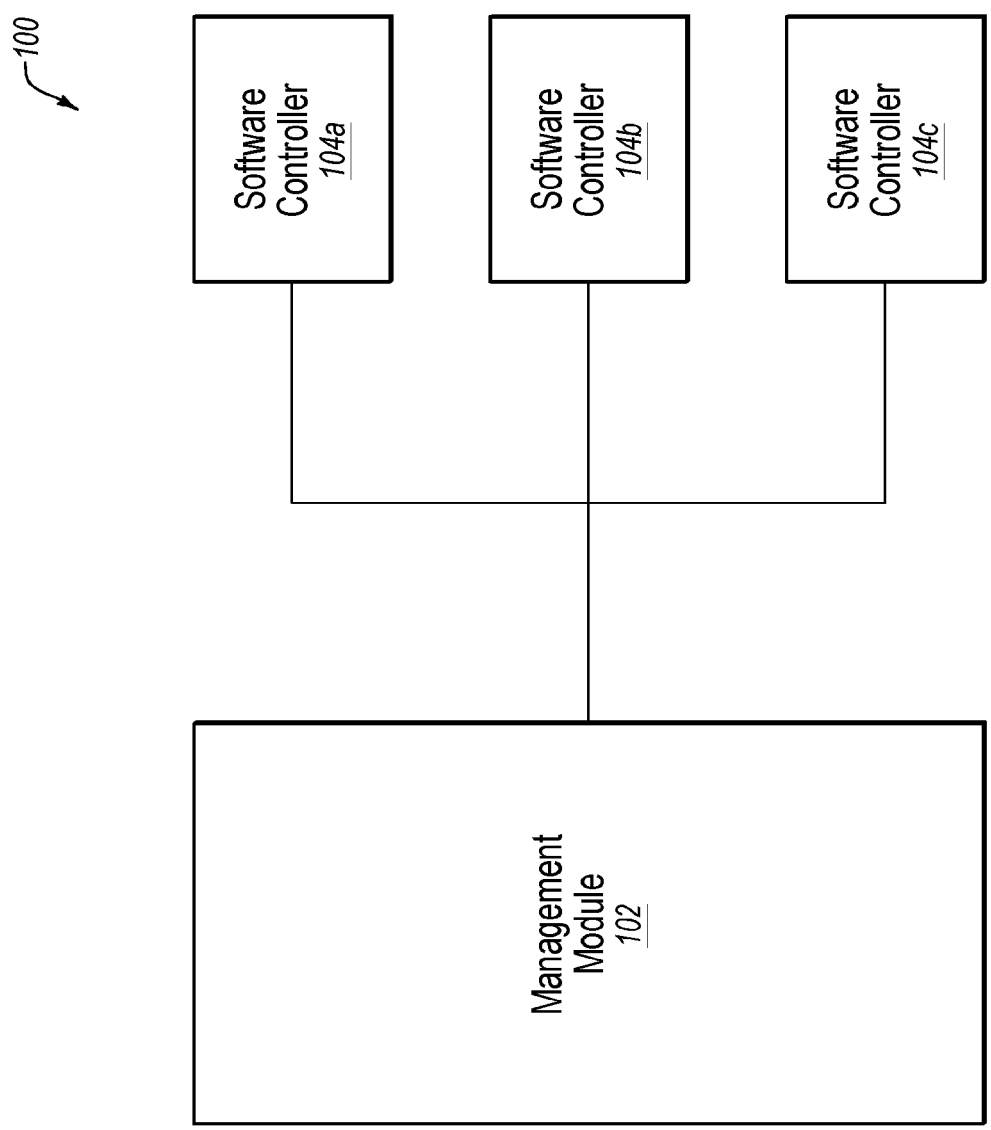
FIG. 1 illustrates an example environment related to selecting transport media.

On some devices currently in use, when a user wishes to initiate a communication session, the user may take one of several different actions. In some embodiments, the user may enter an identifier for an individual for the communication session. The identifier may include a telephone number, a username, or other identifying information. In some embodiments, the user may select a contact for the communication session. In these and other embodiments, a contact may include any person or entity who may be contacted by the user. A contact is not limited to information stored on a user device and may include any identifier that may be used to initiate a communication session with an individual. For example, in some embodiments, a contact may include a telephone number, a username, and a name with contact information stored therewith (e.g., a name with a corresponding phone number, email address, username, etc.). Additionally or alternatively, the user may determine what transport medium to use during the communication session based on the selected action. For example, some contacts and their associated user devices may use multiple different transport media for communication sessions such as a cellular telephone transport medium, a video chat transport medium, a voice over internet protocol (VoIP) transport medium, among other media. Additionally or alternatively, some identifiers may be associated with different transport media. Additionally or alternatively, the user (and corresponding user device) may use similar transport media as that used by the contact or as that associated with the identifier for communication sessions. In some instances, the user may select a specific transport medium that both the contact and the user use. In some instances, the user may open a software application for the selected transport medium. Alternatively or additionally, in some embodiments, the user may open or interact with a different user interface for the selected transport medium. In these and other embodiments, each transport medium may be associated with a different user interface. The user may then identify a contact identification for the contact for the selected transport medium. For example, a contact may have a username associated with a VoIP transport medium. The user may then select a software application that corresponds to the VoIP transport medium to transmit a communication request to the contact at the username. In the present disclosure, reference to establishing a communication session with a user or with a contact may refer to establishing a communication session with a device that is associated with the user or with the contact.

In some instances, the user may select a specific transport medium that both the contact and the user use. In some instances, the user may not open a software application for the selected transport medium but may identify a contact identification for the contact for the selected transport medium. For example, a contact may have a username associated with the VoIP transport medium. The user may transmit a communication request to the contact at the username.

Some embodiments in this disclosure relate to a method and/or system that may automatically select a transport medium for a communication session for a device. For example, a contact, such as a human being, may have a variety of methods of being contacted. In some embodiments, the contact may have a plain old telephone service (POTS) telephone number, a VoIP telephone number, a video calling username, a video chat user name, or user identifications for other audio or audio/video transport media. In some embodiments, a user of the device may use similar transport media. The device may be configured to include a priority order among the transport media. The priority order may be an ordering of the priority for selecting a transport medium from multiple transport media for a particular communication request. The device may be configured to select a transport medium with a higher priority in response to a request to establish a communication session with the contact. Additionally or alternatively, the device may select the transport medium automatically without receiving additional user input. As such, the user may not have to provide input regarding which transport medium and corresponding software application to select to initiate a communication session with a particular contact.

In these or other embodiments, a particular transport medium may be selected from among multiple transport media based on one or more factors. In some embodiments, the factors may include an availability of each transport medium when a request to establish an outbound communication session is received, a cost associated with each transport medium, and user preferences among the transport media. As a result, the device may be configured to automatically select a transport medium and attempt to establish a communication session with a contact via the selected transport medium based on the one or more factors such that a communication session via the selected transport medium may be established. Additionally or alternatively, the communication session via the selected transport medium may be established without the user of the device having to interact with the device in a manner to select an appropriate transport medium.

In some embodiments, a contact may be associated with both video and non-video transport media. In these and other embodiments, the contact may be associated with multiple video transport media and multiple non-video transport media. In these and other embodiments, a user may choose to send a request to establish a communication session to the contact. In some embodiments, the user may be queried to determine if the user desires to send a request to establish a video communication session or a non-video communication session. The desired type of communication session may be established without the user of the device having to interact with the device in a manner to select an appropriate transport medium of the desired type.

For example, a user device may receive a first request to establish a first communication session with a contact. For example, a user may select to contact a contact from a user device to a device of the contact. The contact may be associated with multiple user identifications. For example, the contact may be associated with a name, an identification number, a username, a phone number, an email address, and other identifiers related to different transport media. The user device may create a priority order among two or more of the transport media to use to contact the device of the contact. For example, a management module may compare the multiple user identifications with the priority order among the transport media. For example, the multiple user identifications may include a telephone number and a video chat username. The telephone number may be associated with a POTS transport medium. The telephone number may also be associated with a VoIP transport medium. The telephone number may be an identification destination for the POTS transport medium and the VoIP transport medium. The video chat username may be associated a video chat transport medium. The video chat username may be an identification destination for the video chat transport medium.

The priority order may have POTS and VoIP transport media at a higher priority than video chat transport media. Furthermore, the priority order may have VoIP at a higher priority than POTS. As a result, the management module may select the VoIP transport medium as the transport medium for the communication session over the POTS or video chat transport media. The user device may accordingly, based on the selection by the management module, send a communication request to the contact via the VoIP transport medium at the contact's telephone number rather than sending the communication request to the contact via a video chat transport medium at the contact's video chat username and rather than sending the communication request to the contact via POTS at the contact's telephone number. The user device may establish a communication session with the contact via the selected transport medium using a software controller associated with the selected transport medium. For example, the user device may establish a telephone call with the contact via VoIP using a software controller associated with the selected transport medium. In some embodiments, the user device may establish the telephone call without the user specifying which transport medium to use, in this case the VoIP transport medium. In addition, the user device may establish the telephone call without the user opening a VoIP software application. In some embodiments, the user device may present the user with an option to select a voice-only communication session or a video and voice communication session. The management module may select a particular transport medium for the video communication session or the voice communication session without the user specifying which transport medium to use. For example, if the user selects a voice-only communication session, the management module may select the VoIP transport medium over the POTS transport medium. In contrast, with existing systems a user may specify the contact and may open the software application for the desired transport medium to send a request to establish a communication session with the contact. In contrast, with existing systems a user may specify the contact and may specify a particular user identification for the contact associated with a particular transport medium to send a request to establish a communication session with the contact.

In some embodiments, the user device may receive a second request to establish a second communication session via a different transport medium. For example, during the telephone call via VoIP, the user may receive an inbound video chat request. An indication of the receipt of the second request may be displayed on a display of the user device. For example, if caller identification information is available, the display may show that a contact specified by the caller identification information is attempting to initiate a second communication session with the user. The user may be able to select to accept or reject the second request. For example, the user may select to accept the second request. In response to selecting to accept the second request, the management module may send a request to a software controller for the VoIP transport medium to place the current VoIP communication session on hold. Additionally or alternatively, the management module may send a request to a software controller for the transport medium of the second request to establish the second communication session via the transport medium of the second request such that the management module may establish the second communication session. For example, the management module may send a request to the software controller for the VoIP transport medium to place the telephone call on hold. The management module may send a request to the software controller for the video chat transport medium to establish a video chat communication session. By sending the request to the software controller for the VoIP transport medium and by sending the request to the software controller for the video chat transport medium, the management module may establish the second communication session without interaction by the user with the software controller for the VoIP transport medium or with the software controller for the video chat transport medium.

In some embodiments, the systems and/or methods described in this disclosure may help to enable the selection of a transport medium on a user device or other devices. In these and other embodiments, the selection of a transport medium may be performed without a user selecting a particular transport medium. In these and other embodiments, a user may not need to interact with the management module and select a particular user identification of the contact to select a particular transport medium. Thus, a user may not have to select between user identifications of a contact in order to send a request for a communication session.

In these and other embodiments, a user may not need to interact with different software applications for different transport media but may instead interact with the management module. Thus, the user may not have to switch software applications when sending a request for a communication session to a contact or during communication sessions when an inbound request for a communication session is received. Thus, the systems and/or methods provide at least a technical solution to a technical problem associated with the design of user devices in the technology of telecommunications.

Turning to the figures, FIG. 1 illustrates an example environment 100 related to selecting transport media. The environment 100 may be arranged in accordance with at least one embodiment described in the present disclosure. The environment 100 may include a management module 102 and multiple software controllers 104. The management module 102 and the multiple software controllers 104 may be part of a user device. Although three software controllers 104 are depicted in FIG. 1, in practice there could be fewer software controllers 104 or more software controllers 104.

The management module 102 may be configured to interact with the multiple software controllers 104 as discussed in detail below. The management module 102 may include code and routines configured to enable a computing device to perform one or more operations described with respect to the management module 102. Additionally or alternatively, the management module 102 may be implemented using hardware including a processor, a microprocessor (e.g., to perform or control performance of one or more operations), a field-programmable gate array (FPGA), or an application-specific integrated circuit (ASIC). In some other instances, the management module 102 may be implemented using a combination of hardware and software. In the present disclosure, operations described as being performed by the management module 102 may include operations that the management module 102 may direct a corresponding system to perform.

In some embodiments, the management module 102 may include a software application. The software application may be configured to allow a user to interact with the management module 102 and to receive information from the management module 102. For example, the software application may include an interface (e.g., a graphical user interface) to allow a user to select a contact from a list of contacts. The list of contacts may be presented in any order. For example, in some embodiments, the list of contacts may be presented in alphabetical order, in order of frequency of contact between the contact and the user device, in order of addition to the list, etc. The software application may be configured to allow a user to select a contact to send a request to initiate a communication session with the contact. In some embodiments, the software application may be configured to allow a user to enter an identifier to send a request to initiate a communication session with the contact. For example, a user may enter a username associated with a transport medium to send a request to initiate a communication session with the username.

The management module 102 may be configured to direct the operation of the software controllers 104 and to interact with a user. For example, in some embodiments, the management module 102 may provide a single graphical user interface through which a user may send requests to initiate communication sessions via a variety of transport media rather than the user having to interact with a separate interface for each of the multiple software controllers 104 and transport media. The transport media may include a wireless data transmission protocol that communicates using short-wavelength ultra-high frequency (UHF) radio waves in the 2.4 GHz industrial, scientific, and medical (ISM) frequency band, a POTS, a VoIP service, a video calling service, a video chat service, a cellular telephone service, a wireless calling service, an audio messaging service, and other services and protocols over which an audio, audiovisual, or textual message may be sent. A transport medium may include Transmission Control Protocol and Internet Protocol (TCP/IP) on a particular port, carrying VoIP audio encoded at a specific bitrate with a specific codec, controlled by a Session Initiation Protocol (SIP) session on another particular port. A transport medium may also include a wireless connection, such as a Bluetooth connection with a particular profile connecting to a particular cellular telephone such that a call may be connected to a cellular network. In some embodiments, the management module 102 may allow a user to send requests to the software controllers 104 to initiate communication sessions via one of many transport media without the user having to select a particular transport medium to send a request.

The management module 102 may be configured to create a priority order among multiple transport media. In some embodiments, the priority order may be created based on a cost to the user to send, receive, or participate in communication sessions for each transport medium. In some embodiments, the priority order may be created based on an availability of each transport medium when a request to establish an outbound communication session is received. For example, in some embodiments, the transport medium may be a wireless connection to a cellular phone. If the cellular phone is out of range, the wireless connection may not be available. In some embodiments, the priority order may be based on user preferences. For example, a user may specify the priority order among the various transport media. In some embodiments, the priority order may be created based on multiple factors, such as both the cost to the user and the availability of each transport medium. The management module 102 may select a particular transport medium and the associated software controller 104 based on user identifiers associated with the contact and based on the priority order. For example, a transport medium with a higher priority may be automatically chosen to be used as the transport medium for the request for a communication session.

Each of the software controllers 104 may be configured to interact with hardware to transmit and receive audio and/or video via a transport medium. Each software controller 104 may each be configured to interact with a specific transport medium. In some embodiments, each software controller 104 may be configured to direct the operation of a different transport medium. In some embodiments, multiple software controllers 104 may be configured to direct the operation of similar transport media. The software controllers 104 may be configured to initiate, terminate, and put on hold communication sessions established via the corresponding transport medium associated with each of the software controllers 104.

For example, each software controller 104 may be configured to transmit outbound communication session requests via its corresponding transport medium. Each software controller 104 may also be configured to receive inbound communication session requests via the specific transport medium with which it corresponds.

For example, a first software controller 104*a* may correspond to a VoIP transport medium and may be configured to interact with a VoIP system in order to send and receive communication requests via the VoIP transport medium. The first software controller 104*a* may be associated with a particular identifier, such as a telephone number. Inbound communication session requests directed to the telephone number of the first software controller 104*a* may be received by the first software controller 104*a*. Additionally or alternatively, the first software controller 104*a* may receive a telephone number as part of an outbound communication session request and may direct the outbound communication session request to the received telephone number.

As another example, a second software controller 104*b* may be configured to interact with POTS hardware in order to send and receive communication requests via the POTS transport medium. The second software controller 104*b* may be associated with a particular identifier, such as a telephone number. For example, the second software controller 104*b* may be connected to a physical phone line and the physical phone line may be associated with the particular identifier, such as a telephone number. As such, the second software controller 104*b* may be associated with the particular identifier (e.g., telephone number) through its connection to the physical phone line and through the association of the physical phone line with the particular identifier. Inbound communication session requests directed to the telephone number of the second software controller 104*b* may be received by the second software controller 104*b*. Additionally or alternatively, the second software controller 104*b* may receive a telephone number as part of an outbound communication session request and may direct the outbound communication session request to the received telephone number.

As another example, a third software controller 104*c* may be configured to interact with a video calling service in order to send and receive communication requests via the video calling transport medium. The third software controller 104*c* may be associated with a particular identifier, such as a username. Inbound communication session requests directed to the username of the third software controller 104*c* may be received by the third software controller 104*c*. Additionally or alternatively, the third software controller 104*c* may receive a username as part of an outbound communication session request and may direct the outbound communication session request to the received username.

The software controllers 104 may be configured to provide information to the management module 102. For example, in some embodiments, each software controller 104 may provide an indication to the management module 102 of the receipt of an inbound communication request in response to receiving an inbound communication request via the transport medium associated with the software controller 104. In some embodiments, the indication of the receipt of an inbound communication request may include sender information associated with a sender of the inbound communication request. In some embodiments, the sender information may be included in the inbound communication request and may include any suitable identifier such as a name, a username, a phone number, an email address, an identification number, any other identifiers, or any combination of the sender information.

An example operation of the environment 100 is as follows. For example, in some embodiments a user may wish to send a communication request to a contact. The contact may include a variety of user identifications. For example, the contact may be associated with multiple telephone numbers, multiple VoIP usernames, multiple video calling usernames, multiple video chat usernames, and/or other transport media communication identifiers. Additionally or alternatively, the user device of the user may include one or more software controllers 104. Each of the software controllers 104 may be associated with a POTS transport medium, a VoIP transport medium, a video calling transport medium, a cellular telephone transport medium, and/or another transport medium. In some embodiments, each of multiple software controllers 104 may be associated with a different transport medium.

The user may open the software application that may be associated with the management module 102. The user may select the contact and may select an option to send a communication request to the contact. In some embodiments, the management module 102 may not present the user with a list of the user identifications associated with the contact. The management module 102 may instead select a transport medium (and corresponding user identification that is associated with the selected transport medium) for the outbound communication session request that is to be sent to the contact. In some embodiments, the selection of the transport medium may be based on a priority order among the transport media associated with the software controllers 104. In some embodiments, the VoIP transport medium may be associated with a higher priority than the POTS transport medium, the video calling service transport medium, and other transport media. As indicated above, the priority order may be based on one or more factors such as a cost to the user to send, receive, or participate in communication sessions for each transport medium, an availability of each transport medium when a request to establish an outbound communication session is received, or user preferences.

In the present example, the management module 102 may select the VoIP transport medium of the management module 102 to send an outbound communication session request because the VoIP transport medium may correspond with the highest priority transport medium among transport media associated with user identifications of the contact. The management module 102 may select a software controller 104 associated with the VoIP transport medium. The management module 102 may provide a telephone number associated with the contact to the selected software controller 104 associated with the VoIP transport medium of the management module 102. For example, as indicated above, the first software controller 104a may be associated with a VoIP transport medium. The management module 102 may provide the telephone number associated with the contact and the request to establish an outbound communication session with the contact to the first software controller 104a associated with the VoIP transport medium.

In response to receiving the request to establish an outbound communication session from the management module 102, the first software controller 104a may interface with the VoIP transport medium and may send the request to establish an outbound communication session to the contact at the telephone number via the VoIP transport medium. A first communication session with the contact may be established by the first software controller 104a via the VoIP transport medium in response to the request.

In some embodiments, the second software controller 104b may also be configured to send an outbound communication request. For example, an outbound POTS communication request may be sent by the second software controller 104b to a recipient via the POTS transport medium. The management module 102 may provide a telephone number and a request to establish an outbound communication session to the second software controller 104b.

In some embodiments, the third software controller 104c may also be configured to send an outbound communication request. For example, an outbound video call request may be sent by the third software controller 104c to a recipient via the video calling transport medium. The management module 102 may provide a username and a request to establish an outbound communication session to the third software controller 104c.

In these and other embodiments, the management module 102 may provide a unified interface for a user to interact with a user device. The user may choose to send a request to establish a communication session with a contact and may not have a preference which transport medium is used to establish the communication session. The management module 102 may use a priority order and the transport media that are associated with the contact to select a transport medium. The management module 102 may select the software controller 104 associated with the selected transport medium. The management module 102 may interface with the selected software controller 104 to send the request to establish an outbound communication session to the contact via the selected transport medium.

In some instances, an inbound communication session request may be received during the duration of the first communication session. In some instances, the inbound communication session request may be received via the same transport medium as that over which the first communication session may be established. For example, as indicated above, the first communication session may be established via the first software controller 104a via the VoIP transport medium. Further, in some instances the first software controller 104a may determine that the user device is receiving an inbound communication request via the VoIP transport medium during the first communication session. Additionally or alternatively, the first software controller 104a may alert the management module 102 concerning the inbound communication request.

For example, an inbound telephone call directed via the VoIP transport medium may be received by the first software controller 104a. The first software controller 104a may present the receipt of the inbound telephone call to the management module 102, potentially together with caller ID information. The management module 102 may provide an indication of the request to establish a second communication session to a user of the user device through a display. The indication may include caller identification information in some instances. The management module 102 may receive a direction from the user to accept or reject the request. In response to receiving a direction from the user to accept the request, the management module 102 may send a direction to the first software controller 104a to place the first communication session on hold. The management module 102 may send a direction to the first software controller 104a to establish a second communication session via the VoIP transport medium. The first software controller 104a may place the first communication session on hold and may establish the second communication session. Additionally or alternatively, in some instances, an inbound communication session request may be received during the duration of the first communication session in which the inbound communication session request may be received via a different transport medium than that over which the first communication session may be performed. As indicated above, the second software controller 104b may be associated with a POTS transport medium. The second software controller 104b may determine that the user device is receiving an inbound communication request via the POTS transport medium. The second software controller 104b may alert the management module 102 concerning the inbound communication request. For example, an inbound telephone call directed to the POTS telephone number associated with the second software controller 104b of the user device may be received by the second software controller 104b. The second software controller 104b may present the receipt of the inbound telephone call to the management module 102. In some embodiments, the second software controller 104b may also present caller ID information related to the source of the inbound telephone call to the management module 102. The management module 102 may provide an indication of the request to establish a second communication session to a user of the user device through a display. The indication may include caller identification information in some instances. The management module 102 may receive a direction from the user to accept or reject the request. In response to receiving a direction from the user to accept the request, the management module 102 may send a direction to the first software controller 104a to place the first communication session on hold. The management module 102 may send a direction to the second software controller 104b to establish a second communication session via the POTS transport medium. The first software controller 104a may place the first communication session on hold and the second software controller 104b may establish the second communication session.

In these and other embodiments, the management module 102 may be configured to interact with a single audio resource and a single microphone. For example, the management module 102 may be configured to interact with a headset of a telephone device. The headset of the telephone device may have a single microphone and a single speaker. The telephone device and the headset may include only one of certain audio circuits or processing capabilities. In some embodiments, if a communication session is established between the telephone device and another device, only one transport medium may be connected to the speaker and the microphone of the telephone device. For example, during a communication session via the VoIP transport medium, the first software controller 104a may be configured to send audio to the speaker and to receive audio from the microphone. To establish a communication session via the POTS transport medium, the first software controller 104a associated with the VoIP transport medium may cease to send and receive audio and the second software controller 104b associated with the POTS transport medium may begin to send and receive audio.

As another example, in some instances, an inbound communication session request may be received during the duration of the first communication session via a video calling service transport medium. As indicated above, the third software controller 104c may be associated with a video calling service transport medium. The third software controller 104c may determine that the user device is receiving an inbound communication request via the video calling service transport medium. The third software controller 104c may alert the management module 102 concerning the inbound communication request. For example, another user of the video calling service may send an inbound video call directed to a user identification such as a username. The username may be associated with the third software controller 104c. The inbound video call request may be received by the third software controller 104c. The third software controller 104c may present the receipt of the inbound video call request to the management module 102. In some embodiments, the third software controller 104c may also present sender identification information related to the source of the inbound video call request to the management module 102. The management module 102 may provide an indication of the request to establish a second communication session to a user of the user device through a display. The indication may include sender identification information in some instances. The management module 102 may receive a direction from the user to accept or reject the request. In response to receiving a direction from the user to accept the request, the management module 102 may send a direction to the first software controller 104a to place the first communication session on hold. The management module 102 may send a direction to the third software controller 104c to establish a second communication session via the video calling transport medium. The first software controller 104a may place the first communication session on hold and the third software controller 104c may establish the second communication session.

Modifications, additions, or omissions may be made to the environment 100 without departing from the scope of the present disclosure. For example, the number of software controllers 104 may be greater or fewer than that described depending on a particular implementation. Additionally, the transport media given are examples and the concepts described may apply to the selection of any applicable transport medium that may be used to conduct a communication session.

Figure 2:
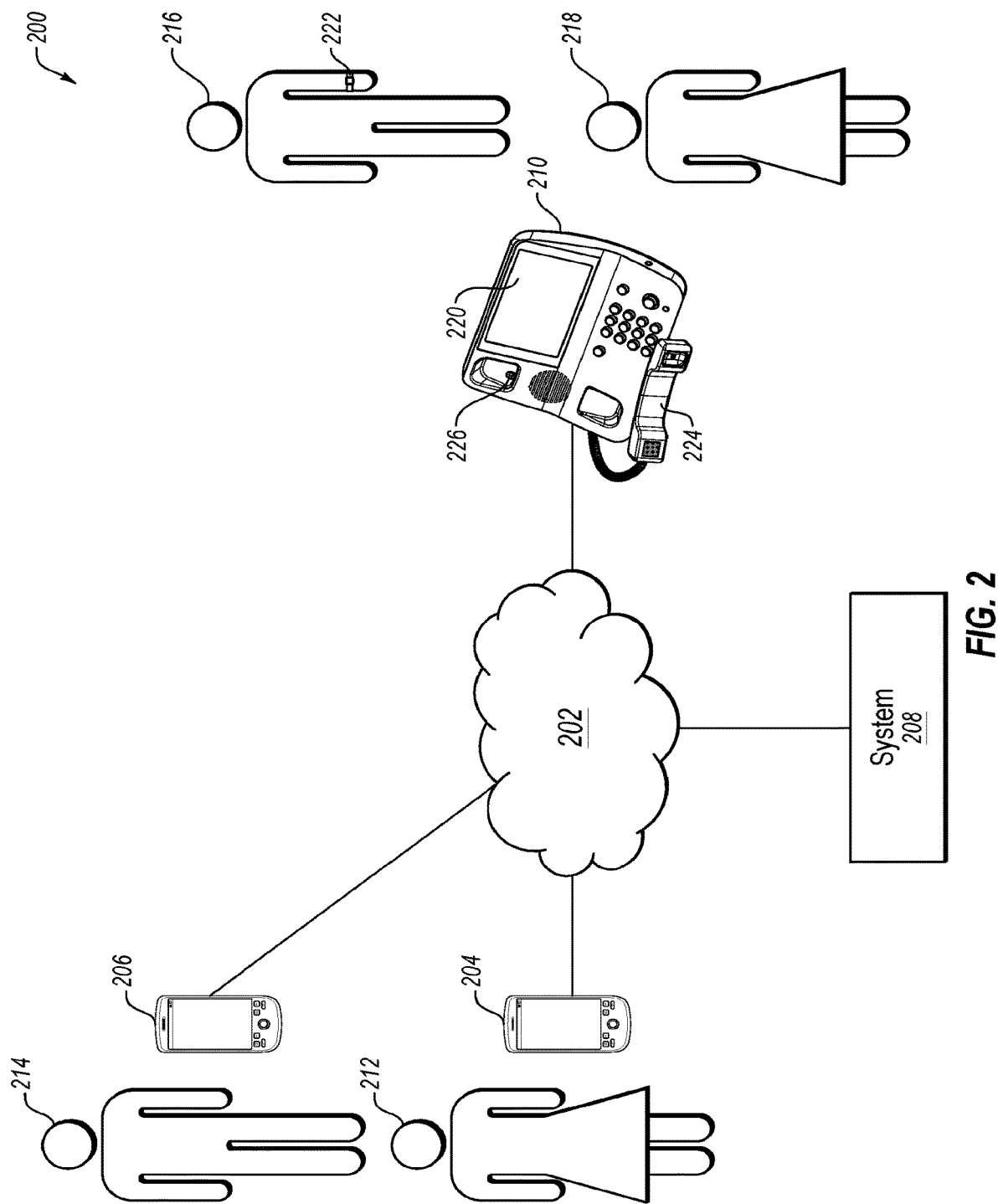
FIG. 2 illustrates an example communication system configured to automatically select a transport medium for a communications session.

FIG. 2 illustrates an example communication system 200 configured to automatically select a transport medium for a communication session. The communication system 200 may be arranged in accordance with at least one embodiment described in the present disclosure. The communication system 200 may include one or more networks 202, a device 204, a device 206, a system 208, and a telephone 210.

The one or more networks 202 may be configured to communicatively couple the device 204, the device 206, the system 208, and the telephone 210. In some embodiments, the one or more networks 202 may be any network or configuration of networks configured to send and receive communications between systems and devices. In some embodiments, the one or more networks 202 may include a conventional type network, a wired or wireless network, and may have numerous different configurations. In some embodiments, the one or more networks 202 may also be coupled to or may include portions of a telecommunications network, including telephone lines, for sending data in a variety of different communication protocols, such as a POTS.

Each of the devices 204 and 206 and the telephone 210 may be any electronic or digital computing device. For example, each of the devices 204 and 206 and the telephone 210 may include a desktop computer, a laptop computer, a smartphone, a mobile phone, a tablet computer, a telephone, a phone console, or any other computing device. In some embodiments, each of the devices 204 and 206 and the telephone 210 may be configured to establish communication sessions with other devices. For example, each of the devices 204 and 206 and the telephone 210 may be configured to establish an outgoing telephone call with another device over a telephone line or network. For example, the devices 204 and 206 may communicate over a wireless cellular network and the telephone 210 may communicate over a public switch telephone network (PSTN) line. Alternatively or additionally, the devices 204 and 206 and the telephone 210 may communicate over other wired or wireless networks that do not include or only partially include a PSTN. For example, a telephone call or communication session between one or both of the devices 204 and 206 and the telephone 210 may be a VoIP telephone call. As another example, the communication session between one or both of the devices 204 and 206 and the telephone 210 may be a video communication session or other communication session. As another example, the communication session between one or both of the devices 204 and 206 and the telephone 210 may be a video calling session, an audio message session, or other communication session. In some embodiments, the device 204 and the device 206 may be associated with different transport media. For example, in some embodiments, the device 204 may be associated with a POTS transport medium and a VoIP transport medium. In some embodiments, the device 206 may be associated with a video calling transport medium.

Alternately or additionally, each of the devices 204 and 206 and the telephone 210 may be configured to communicate with other systems over a network, such as the one or more networks 202 or another network. In these and other embodiments, the devices 204 and 206 and the telephone 210 may receive data from and send data to the system 208. For example, the devices 204 and 206 and the telephone 210 may include memory and at least one processor, which are configured to perform operations as described in this disclosure, among other operations. In some embodiments, the devices 204 and 206 and the telephone 210 may include computer-readable instructions that are configured to be executed by the devices 204 and 206 and the telephone 210 to perform operations described in this disclosure.

In some embodiments, the system 208 may include any configuration of hardware, such as processors, servers, etc., that are networked together and configured to perform a task. For example, the system 208 may include multiple computing systems, such as multiple servers that each include memory and at least one processor, which are networked together and configured to perform operations of captioning communication sessions, such as telephone calls, between devices such as the telephone 210 and another devices as describe in this disclosure. In these and other embodiments, the system 208 may operate to caption audio generated by one or more parties in the communication session. For example, the system 208 may caption audio generated by other devices and not the telephone 210 or both the telephone 210 and other devices, among other configurations.

In some embodiments, the system 208 may operate as an exchange configured to establish communication sessions, such as telephone calls, video calls, etc. between devices such as the telephone 210 and another device or devices as described in this disclosure, among other operations. In some embodiments, the system 208 may include computer-readable instructions that are configured to be executed by the system 208 to perform operations described in this disclosure.

Further, in some embodiments, the communication system 200 may be configured to facilitate an assisted communication session between a hearing-impaired user 216 or a hearing-impaired user 218 (such as a husband and wife who share a single telephone 210) and a second user, such as the user 212 or the user 214. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, the assisted communication session may be established between a device such as the device 204 or the device 206 and the telephone 210. In these embodiments, the telephone 210 may be a captioning telephone that is configured to present captions of the communication session to the hearing-impaired user 216 or the hearing-impaired user 218, such as one of the CaptionCall® 57T model family or 67T model family of captioning telephones or a device running the CaptionCall® mobile app. For example, in some embodiments, the telephone 210 may include a visual display 220 that is integral with the telephone 210 and that is configured to present text captions of a communication session to the hearing-impaired user 216 or the hearing-impaired user 218. In these and other embodiments, the telephone 210 may be configured for use by multiple hearing impaired users using user profiles. For example, the telephone may be configured with a first user profile corresponding to the hearing-impaired user 216 and with a second user profile corresponding to the hearing-impaired user 218. Each user profile may include settings that are specific to the corresponding user, such as text size on the visual display 220, volume of the telephone 210, or user-specific ring-tones of the telephone 210, among other settings.

Alternatively or additionally, the telephone 210 may be associated with a visual display that is physically separate from the telephone 210 and that is in wireless communication with the telephone 210, such as a visual display of a wearable device 222 worn on the wrist of the hearing-impaired user 216 and configured to be in BlueTooth® wireless communication with the telephone 210. Other physically separate physical displays may be visual displays of desktop computers, laptop computers, smartphones, mobile phones, tablet computers, or any other computing devices that are in wireless communication with the telephone 210.

The telephone 210 may also include a handset 224 and a switch hook 226. In some embodiments, the telephone 210 may be configured to select different transport media for communication sessions. For example, the telephone 210 may be configured to select a different transport medium to send an outbound communication session request to the device 204 than may be selected to send an outbound communication session request to the device 206. An example of the selection of different transport media for communication sessions is given with respect to FIG. 3, which includes a console 310 that may be part of an example implementation of the telephone 210.

During a captioning communication session, the system 208 and the device 204 or the device 206 and the telephone 210 may be communicatively coupled using networking protocols. In some embodiments, during the communication session between the device 204 or the device 206 and the telephone 210, the telephone 210 may provide the audio signal from the device 204 or the device 206 to the system 208.

At the system 208, the audio signal may be transcribed. In some embodiments, to transcribe the audio signal, a call assistant may listen to the audio signal received from the device 204 or the device 206 and "revoice" the words of the user 212 or the user 214 to a speech recognition computer program tuned to the voice of the call assistant. In these and other embodiments, the call assistant may be an operator who serves as a human intermediary between the hearing-impaired user 216 or the hearing-impaired user 218 and the user 212 or the user 214. In some embodiments, text captions may be generated by a speech recognition computer as a transcription of the audio signal of the user 212 or the user 214. The text captions may be provided to the telephone 210 being used by the hearing-impaired user 216 or the hearing-impaired user 218 over the one or more networks 202. The telephone 210 may display the text captions while the hearing-impaired user 216 or the hearing-impaired user 218 carries on a normal conversation with the user 212 or the user 214. The text captions may allow the hearing-impaired user 216 or the hearing-impaired user 218 to supplement the voice signal received from the device 204 or the device 206 and confirm his or her understanding of the words spoken by the user 212 or the user 214.

Modifications, additions, or omissions may be made to the communication system 200 without departing from the scope of the present disclosure. For example, in some embodiments, the user 212 or the user 214 may also be hearing-impaired. In these and other embodiments, the system 208 may provide text captions to the device 204 or the device 206 based on audio data transmitted by the telephone 210. Alternately or additionally, the system 208 may include additional functionality. For example, the system 208 may edit the text captions or make other alterations to the text captions after presentation of the text captions on the telephone 210. Alternately or additionally, in some embodiments, the communication system 200 may include additional devices similar to the devices 204 and 206 and the telephone 210. In these and other embodiments, the similar devices may be configured to automatically select a transport medium for a communication session.

Figure 3:
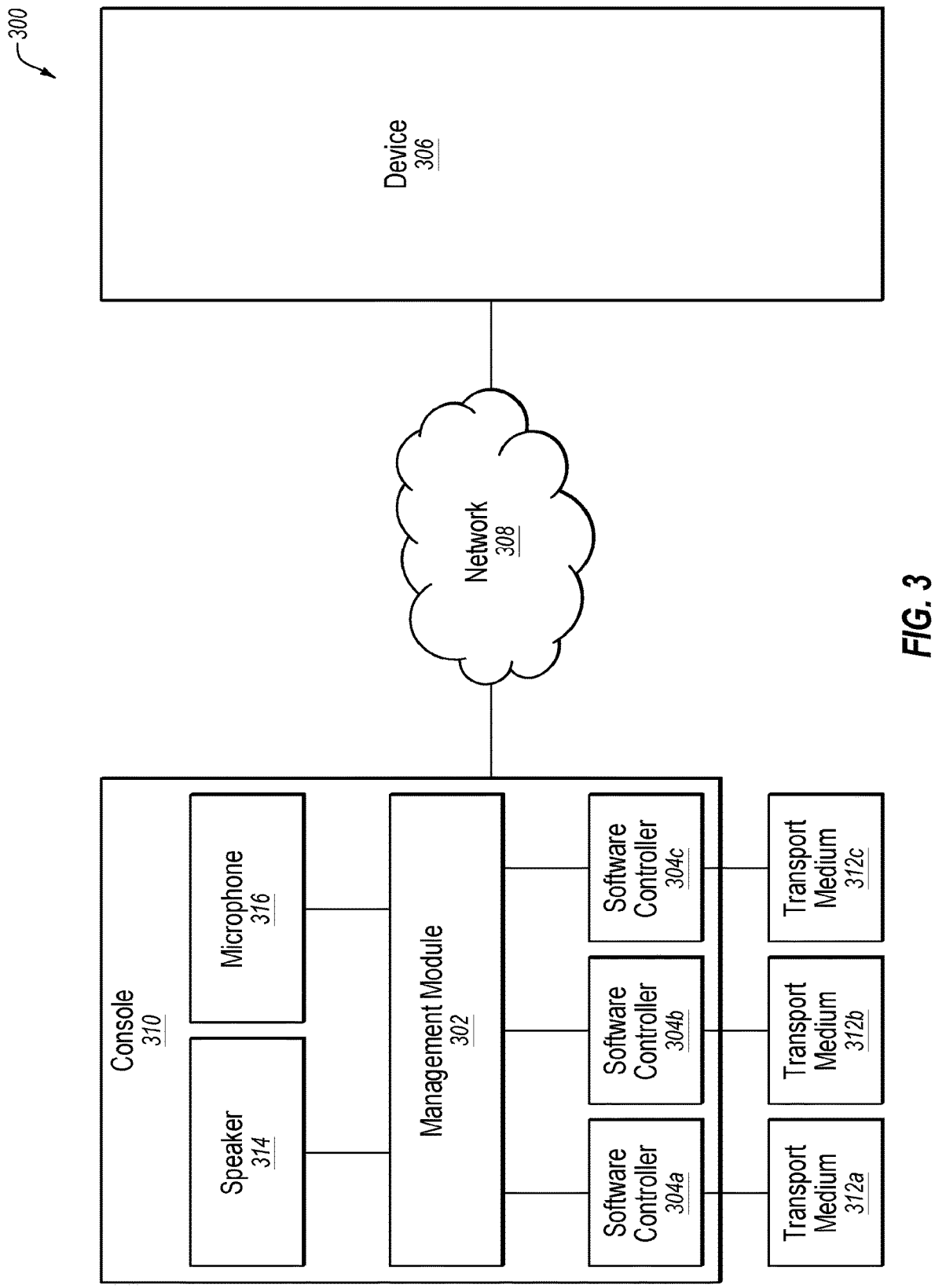
FIG. 3 illustrates an example system configured to automatically select a transport medium for a communications session.

FIG. 3 illustrates an example system 300 configured to automatically select a transport medium for a communication session. The system 300 may be arranged in accordance with at least one embodiment described in the present disclosure. The system 300 may include a network 308, a device 306, multiple transport media 312a-c, and a console 310 with a management module 302, multiple software controllers 304a-c, a speaker 314, and a microphone 316.

The console 310 may be similar or analogous to the telephone 210 of FIG. 2. The console may have hardware and/or software connections for different transport media, such as one or more PSTN connections for a POTS transport medium, an internet connection for a VoIP transport medium, a cellular phone connection for a cellular transport medium, and other connections for a video calling transport medium and other transport media.

The management module 302 may be similar or analogous to the management module 102 of FIG. 1. The management module 302 may be a software module that may be configured to interact with the multiple software controllers 304. The management module 302 may be configured to select a transport medium 312 and the software controller 304 associated with the selected transport medium 312. The management module 302 may be configured to select a transport medium 312 based on a priority order in a manner as described above with respect to the management module 102 of FIG. 1. The management module 302 may also be configured to interact with the speaker 314 and the microphone 316. In some embodiments, the management module 302 may be configured to direct audio from one of the transport media 312 to the speaker 314 via one of the software controllers 304. In some embodiments, the management module 302 may be configured to direct audio from the microphone 316 to one of the transport media 312 via one of the software controllers 304. The management module 302 may direct audio to the selected transport medium 312 and from the selected transport medium 312. The management module 302 may also interface with a display of the console 310 to present video to a user of the console 310. In some instances, the display may present video during a video communication session. The management module 302 may also interface with a camera of the console 310 to record video and transmit video for a video communication session.

The speaker 314 may be a standard speaker, a headset capable of producing sound, or another device capable of generating sound from digital signals. The speaker 314 may be configured to allow a user of the console 310 to hear audio received from the device 306 via the network 308 and one of the transport media 312. The microphone 316 may be a standard microphone, a headset capable of receiving sound, or another device capable of receiving sound and converting sound into digital signals. The microphone 316 may be configured to allow a user of the console 310 to transmit audio to the device 306 via the network 308 and one of the transport media 312. The speaker 314 and the microphone 316 may be configured to interface with the console 310 via a wireless connection. For example, the speaker 314 and the microphone 316 may be part of a Bluetooth headset which may be configured to interact with the console 310.

The software controllers 304 may be similar to the software controllers 104 of FIG. 1. Each of the software controllers 304 may be configured to interact with one of the transport media 312. For example, the software controller 304a may be configured to interact with the transport medium 312a but may not be configured to interact with the transport medium 312b and 312c.

The transport medium 312 may include a wireless data transmission protocol that communicates using short-wavelength ultra-high frequency (UHF) radio waves in the 2.4 GHz industrial, scientific, and medical (ISM) frequency band, a POTS, a VoIP service, a video calling service, a video chat service, a cellular telephone service, a wireless calling service, an audio messaging service, and other services and protocols over which an audio, audiovisual, or textual message may be sent.

For example, a user may choose to send a request for a communication session to a particular contact. The contact may include user identifiers associated with multiple transport media. In some instances, the contact may include a telephone number. The management module 302 may select the transport medium 312b for the particular communication session based on the priority order for the transport media and based on the transport media associated with the contact. The transport medium 312b may be a VoIP telephone transport medium, which may have a higher priority than other transport media. The management module 302 may select a software controller 304b which may be associated with the VoIP transport medium 312b. The management module 302 may provide the user identifier for the request for a communication session, in this case the telephone number, to the software controller 304b. The software controller 304b may interface with the transport medium 312b and may send the request for a communication session to the contact at the telephone number via the VoIP transport medium 312b. The software controller 304b may establish a communication session with an electronic device of the contact via the VoIP transport medium 312b. The management module 302 may receive audio from the transport medium 312b via the software controller 304b and may provide the audio to the speaker 314. The management module 302 may receive audio from the microphone 316 and may provide the audio to the transport medium 312b via the software controller 304b.

In some instances, the management module 302 may direct one or more of the software controllers 304 to place the corresponding transport medium 312 on hold or to terminate a communication session. For example, during a first communication session via a first transport medium 312, a request to establish a communication session may be received via a second transport medium 312. The first transport medium may be different from the second transport medium 312. In response to a selection by a user to establish a second communication session via the second transport medium, the management module 302 may direct a software controller 304 corresponding to the first transport medium 312 to place the first transport medium 312 on hold. The management module 302 may stop sending audio to the software controllers 304 that are placed on hold and may stop receiving audio from the software controllers 304 that are placed on hold. In some embodiments, in response to the selection by the user, the management module 302 may direct a software controller 304 corresponding to the first transport medium 312 to terminate the first communication session established via the first transport medium 312. To place a communication session on hold or to terminate a communication session, a signal may be sent to the transport medium. For example, the signal may indicate that the communication session is being placed on hold or that the communication session is being terminated. In these and other embodiments, the signal may inform the transport medium and other participants in a communication session that the communication session is being placed on hold or terminated. In some embodiments, the first communication session may be a video communication session. In these and other embodiments, the management module 302 may stop sending audio and video to the software controllers 304 that are placed on hold and may stop receiving audio and video from the software controllers 304 that are placed on hold. To establish a communication session via the second transport medium 312, the software controller 304 may send an indication of acceptance to the second transport medium 312 and the management module 302 may start to send audio to the second transport medium 312 and may start to receive audio from the second transport medium.

The device 306 may be similar or analogous to the device 204 and/or the device 206 of FIG. 2. The device 306 may be a device associated with a contact of the console 310. The device 306 may be configured to receive and send requests to initiate communication sessions via multiple transport media. The console 310 may send requests to initiate communication sessions to the device 306 via the network 308. The console 310 may receive requests to initiate communication sessions from the device 306 via the network 308. The communication sessions with the device 306 may be established via one of the transport media 312.

For example, in some embodiments, the device 306 may be configured to receive and send requests to initiate communication sessions via the VoIP transport medium. In response to a user of the console 310 selecting to send a request to initiate a communication session with a contact associated with the device 306, the management module 302 may select the VoIP transport medium 312b. The management module 302 may select a software controller 304b associated with the VoIP transport medium 312b. Audio from the microphone 316 may be transmitted to the device 306 from the console 310 via the management module 302, the software controller 304b, and the VoIP transport medium 312b. Audio from the device 306 may be transmitted to the speaker 314 of the console 310 via the transport medium 312b, the software controller 304b, and the management module 302. In these and other embodiments, the device 306 may receive audio and may transmit audio via a different transport medium than the console 310. For example, the console 310 may transmit audio and obtain audio via the VoIP transport medium 312b while the device 306 may receive audio and may transmit audio via a POTS transport medium. Alternatively or additionally, the console 310 may transmit audio and obtain audio via the VoIP transport medium 312b while the device 306 may receive audio and may transmit audio via a cellular telephone transport medium.

Alternatively, for example, in some embodiments, the device 306 may be configured to receive and send requests to initiate communication sessions via a video calling transport medium. In response to a user of the console 310 selecting to send a request to initiate a communication session with a contact associated with the device 306, the management module 302 may select a video calling transport medium 312c. The management module 302 may select a software controller 304c associated with the video calling transport medium 312c. Audio and video may be transmitted to the device 306 from the console 310 via the management module 302, the software controller 304c, and the video calling transport medium 312c. Audio and video from the device 306 may be transmitted to the console 310 via the transport medium 312c, the software controller 304c, and the management module 302.

Modifications, additions, or omissions may be made to the system 300 without departing from the scope of the present disclosure. For example, in some embodiments, the software controllers 304 may interface with the speaker 314 and the microphone 316 directly. In these and other embodiments, the management module 302 may send a request to the software controllers 304 but may not receive audio from or provide audio to the transport media. In these and other embodiments, the management module 302 may not provide audio to the speaker and may not receive audio from the microphone. In these and other embodiments, the similar devices may be configured to automatically select a transport medium for a communication session. In some embodiments, the console 310 may include a camera. For example, in some embodiments, the camera may be configured to record video. The management module 302 may be configured to transmit audio and video to the software controllers 304.

Figure 4:
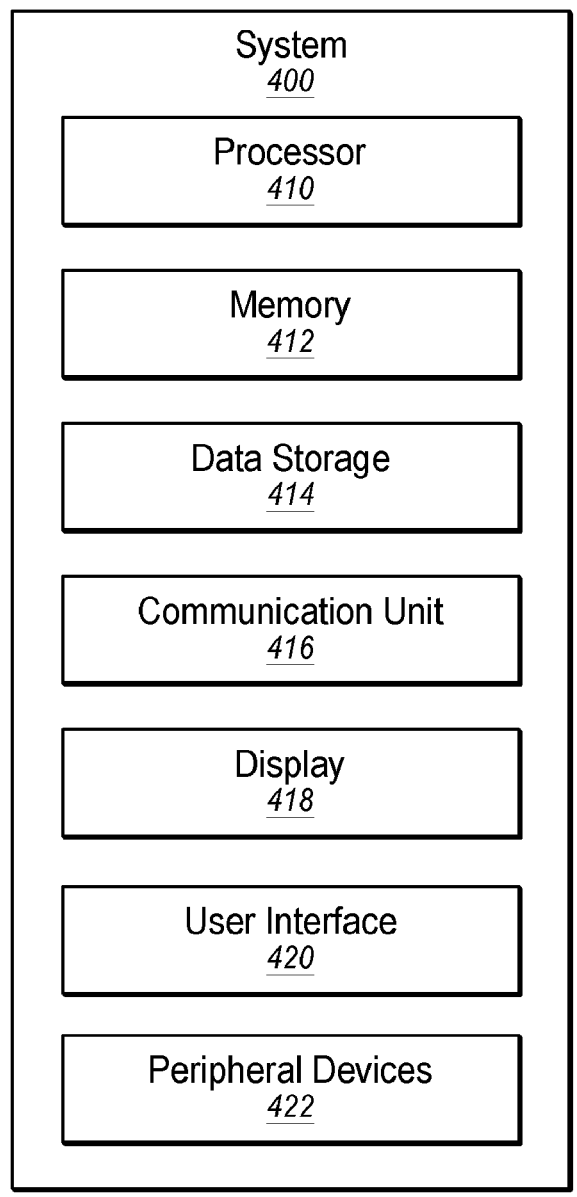
FIG. 4 is illustrates an example computing system that may be used in automatically establishing a communication session associated with an event

FIG. 4 illustrates an example computing system 400 that may be used in automatically selecting a transport medium for a communication session. The system 400 may be arranged in accordance with at least one embodiment described in the present disclosure. The system 400 may include a processor 410, a memory 412, a data storage 414, a communication unit 416, a display 418, a user interface unit 420, and a peripheral device 422, which all may be communicatively coupled. In some embodiments, the system 400 may be part of any of the systems or devices described in this disclosure. For example, the system 400 may be part of any of the devices 204 and 206, the telephone 210, or the system 208 of FIG. 2.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 4, it is understood that the processor 410 may include any number of processors distributed across any number of networks or physical locations that are configured to perform individually or collectively any number of operations described herein. In some embodiments, the processor 410 may interpret and/or execute program instructions and/or process data stored in the memory 412 or the data storage 414. In some embodiments, the processor 410 may fetch program instructions from the data storage 414 and load the program instructions into the memory 412.

After the program instructions are loaded into the memory 412, the processor 410 may execute the program instructions. For example, the system 400 may be part of the device 204, the device 206, the system 208, or the telephone 210 of FIG. 2. In these and other embodiments, the instructions may include the processor 410 automatically selecting a transport medium for a communication session.

The memory 412 and the data storage 414 may include computer-readable storage media for carrying or having computer-executable instructions or data structures stored thereon. Such computer-readable storage media may be any available media that may be accessed by a general-purpose or special-purpose computer, such as the processor 410. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations, such as one or more blocks of the method 600, the method 700, or the method 800.

The communication unit 416 may include any component, device, system, or combination thereof that is configured to transmit or receive information over a network. In some embodiments, the communication unit 416 may communicate with other devices at other locations, the same location, or even other components within the same system. For example, the communication unit 416 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMAX device, cellular communication facilities, etc.), plain old telephone service (POTS), and/or the like. The communication unit 416 may permit data to be exchanged with a network and/or any other devices or systems described in the present disclosure.

The display 418 may be configured as one or more displays, like an LCD, LED, or other type display. The display 418 may be configured to present video, text captions, user interfaces, and other data as directed by the processor 410.

The user interface unit 420 may include any device to allow a user to interface with the system 400. For example, the user interface unit 420 may include a mouse, a track pad, a keyboard, a touchscreen, a telephone switch hook, a telephone keypad, volume controls, and/or other special purpose buttons, among other devices. The user interface unit 420 may receive input from a user and provide the input to the processor 410.

The peripheral devices 422 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may play audio received by the system 400 or otherwise generated by the system 400.

Modifications, additions, or omissions may be made to the system 400 without departing from the scope of the present disclosure.

Figure 5:
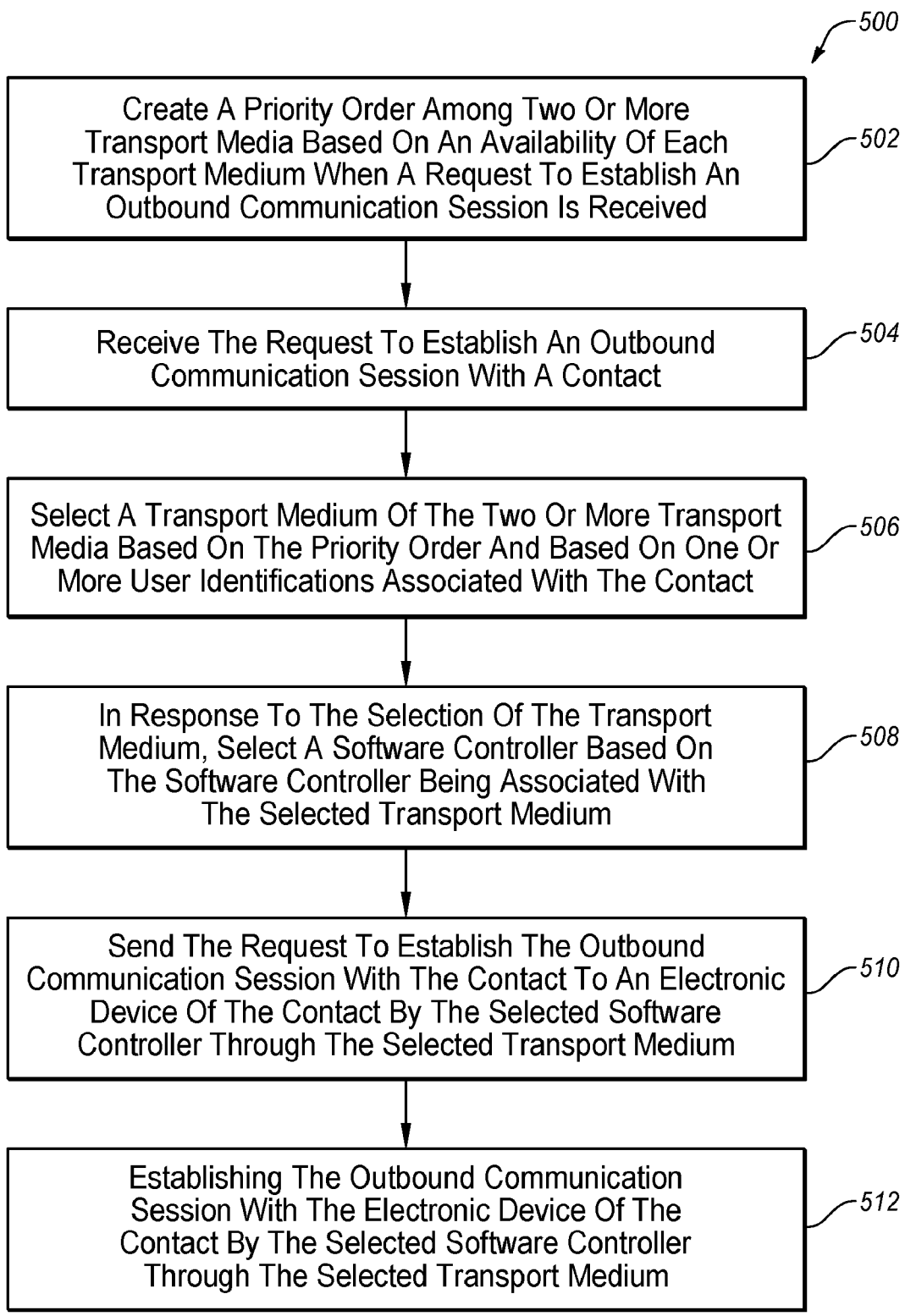
FIG. 5 is a flowchart of an example method for automatically selecting a transport medium for a communications session.

FIG. 5 is a flowchart of an example computer-implemented method to establish an outbound communication session. The method 500 may be arranged in accordance with at least one embodiment described in the present disclosure. The method 500 may be performed, in whole or in part, in some embodiments by a system and/or environment, such as the environment 100, the communication system 200, the system 300, and/or the system 400 of FIGS. 1, 2, 3, and 4, respectively. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where a priority order among two or more transport media may be created based on an availability of each transport medium when a request to establish an outbound communication session is received. In some embodiments, the priority order may further be based on a cost to the user to send, receive, or participate in communication sessions for each transport medium and user preferences. In some embodiments, the transport media may include a wireless data transmission protocol that communicates using short-wavelength ultra-high frequency (UHF) radio waves in the 2.4 GHz industrial, scientific, and medical (ISM) frequency band, a plain old telephone service (POTS), a Voice over Internet Protocol (VoIP) service, a video calling service, a video chat service, a cellular telephone service, a wireless calling service, and an audio messaging service. In block 504, the request to establish an outbound communication session with a contact may be received. In some embodiments, the contact may include a name.

In block 506, a transport medium of the two or more transport media may be selected based on the priority order and based on one or more user identifications associated with the contact. In some embodiments, the user identifications may include an identification number, a username, a phone number, and an email address.

In block 508, in response to the selection of the transport medium, a software controller may be selected based on the software controller being associated with the selected transport medium.

In block 510, the request to establish the outbound communication session with the contact may be sent to an electronic device of the contact by the selected software controller through the selected transport medium. In block 512, the outbound communication session with the electronic device of the contact may be established by the selected software controller through the selected transport medium.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 500 may further include receiving a request to establish a second communication session through a second software controller associated with a second transport medium, the second transport medium being different from the selected transport medium. The method 500 may further include providing to a user, through a manager, an indication of the request and obtaining a direction from the user to accept or reject the request. The method 500 may further include, in response to obtaining the direction to accept the request, sending a request to the selected software controller associated with the selected transport medium to place the outbound communication session on hold by sending a signal to the selected transport medium, ceasing to send audio to the selected transport medium, and ceasing to receive audio from the selected transport medium, sending a request to the second software controller to activate the second transport medium, and establishing the second communication session by sending an indication of acceptance to the second transport medium, starting to send audio to the second transport medium, and starting to receive audio from the second transport medium.

Figure 6:
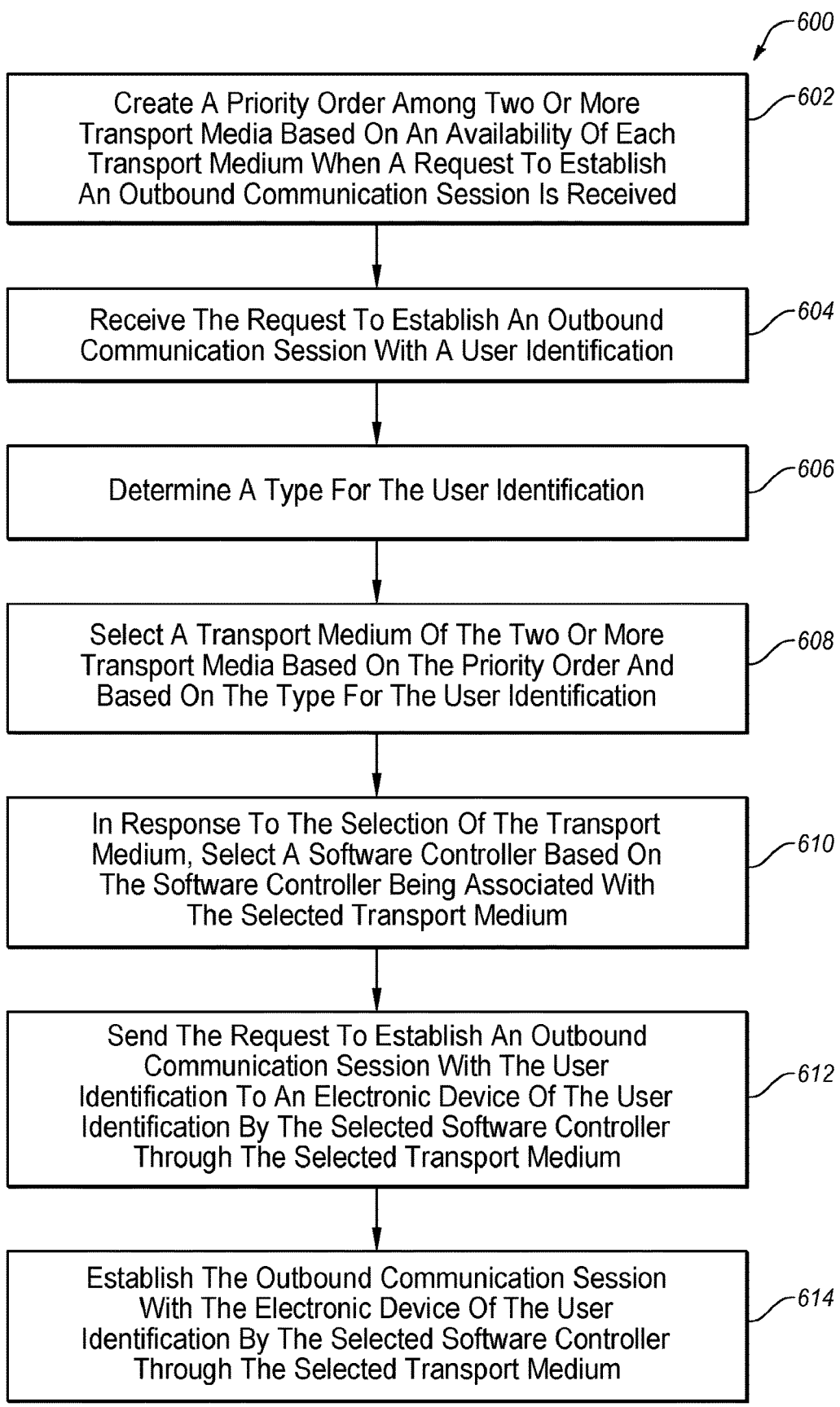
FIG. 6 is a flowchart of an example method for automatically selecting a transport medium for a communications session.

FIG. 6 is a flowchart of another example computer-implemented method to establish an outbound communication session. The method 600 may be arranged in accordance with at least one embodiment described in the present disclosure. The method 600 may be performed, in whole or in part, in some embodiments by a system and/or environment, such as the environment 100, the communication system 200, the system 300, and/or the system 400 of FIGS. 1, 2, 3, and 4, respectively. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where a priority order among two or more transport media may be created based on an availability of each transport medium when a request to establish an outbound communication session is received. In some embodiments, the priority order may further be based on a cost to send, receive, or participate in communication sessions for each transport medium and user preferences. In some embodiments, the transport media may include a wireless data transmission protocol that communicates using short-wavelength ultra-high frequency (UHF) radio waves in the 2.4 GHz industrial, scientific, and medical (ISM) frequency band, a plain old telephone service (POTS), a Voice over Internet Protocol (VoIP) service, a video calling service, a video chat service, a cellular telephone service, a wireless calling service, and an audio messaging service. In block 604, the request to establish an outbound communication session with a user identification may be received. In some embodiments, the user identification may include one or more of an identification number, a username, a phone number, a name, and an email address.

In block 606, a type for the user identification may be determined. In block 608, a transport medium of the two or more transport media may be selected based on the priority order and based on the type for the user identification.

In block 610, in response to the selection of the transport medium, a software controller may be selected based on the software controller being associated with the selected transport medium.

In block 612, the request to establish an outbound communication session with the user identification may be sent to an electronic device of the user identification by the selected software controller through the selected transport medium. In block 614, the outbound communication session with the user identification may be established by the selected software controller through the selected transport medium.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 600 may further include receiving a request to establish a second communication session through a second software controller associated with a second transport medium, the second transport medium being different from the selected transport medium. The method 600 may further include providing to a user, through a manager, an indication of the request and obtaining a direction from the user to accept or reject the request. The method 600 may further include, in response to obtaining the direction to accept the request, sending a request to the selected software controller associated with the selected transport medium to place the outbound communication session on hold by sending a signal to the selected transport medium, ceasing to send audio to the selected transport medium, and ceasing to receive audio from the selected transport medium, sending a request to the second software controller to activate the second transport medium, and establishing the second communication session by sending an indication of acceptance to the second transport medium, starting to send audio to the second transport medium, and starting to receive audio from the second transport medium.

Alternatively or additionally, the method 600 may further include receiving a request to establish a second communication session through a second software controller associated with a second transport medium, the second transport medium being different from the selected transport medium. The method 600 may further include providing to a user, through a manager, an indication of the request and obtaining a direction from the user to accept or reject the request. The method 600 may further include, in response to obtaining the direction to accept the request, sending a request to the selected software controller associated with the selected transport medium to terminate the outbound communication session by sending a signal of termination to the selected transport medium, ceasing to send audio to the selected transport medium, and ceasing to receive audio from the selected transport medium, sending a request to the second software controller to activate the second transport medium, and establishing the second communication session by sending an indication of acceptance to the second transport medium, starting to send audio to the second transport medium, and starting to receive audio from the second transport medium.

Figure 7:
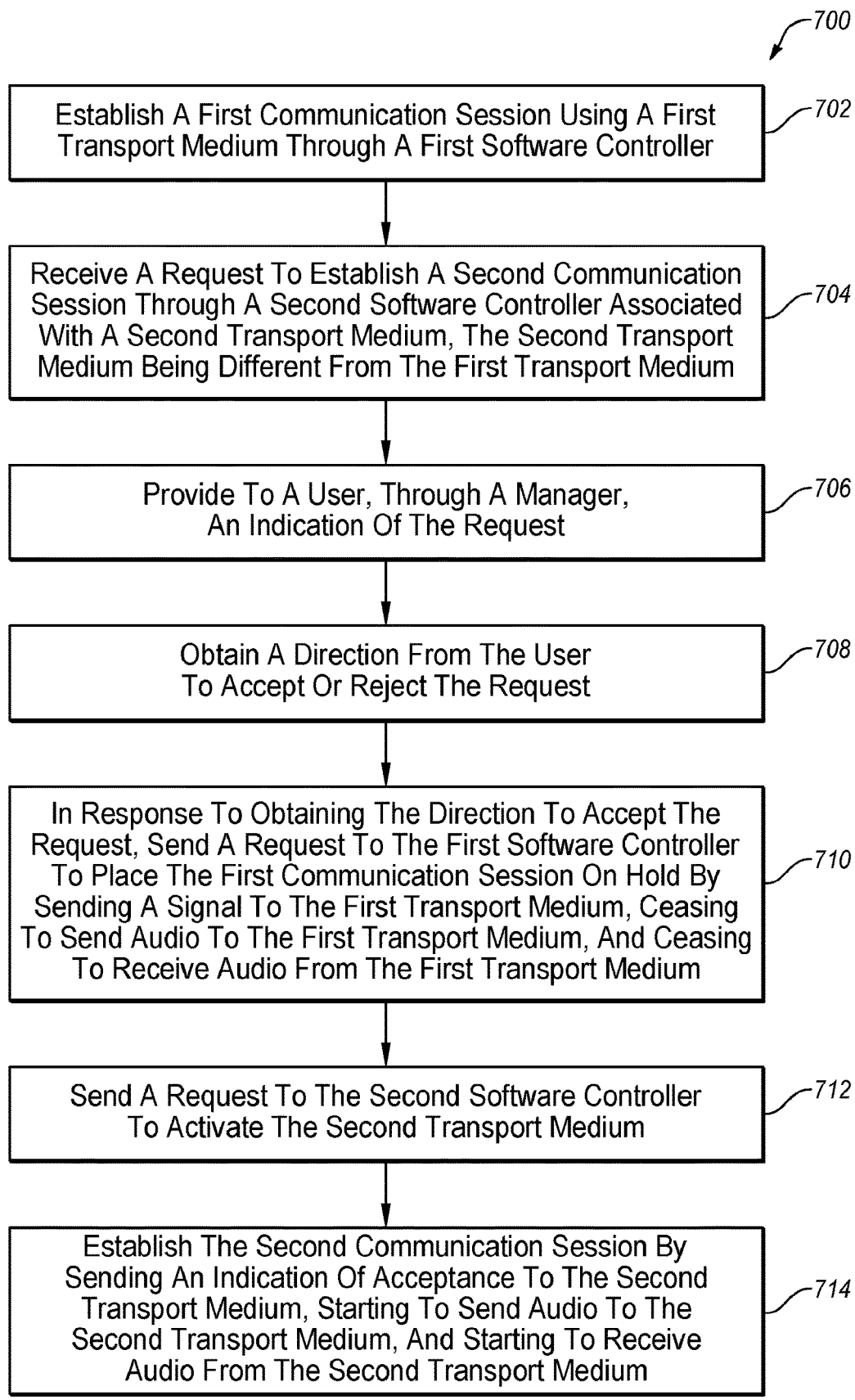
FIG. 7 is a flowchart of an example method for automatically selecting a transport medium for a communications session.

FIG. 7 is a flowchart of an example computer-implemented method to establish a communication session. The method 700 may be arranged in accordance with at least one embodiment described in the present disclosure. The method 700 may be performed, in whole or in part, in some embodiments by a system and/or environment, such as the environment 100, the communication system 200, the system 300, and/or the system 400 of FIGS. 1, 2, 3, and 4, respectively. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 700 may begin at block 702, where a first communication session may be established using a first transport medium through a first software controller. In block 704, a request to establish a second communication session through a second software controller associated with a second transport medium, the second transport medium being different from the first transport medium, may be received. In some embodiments, the first transport medium and the second transport medium may include a wireless data transmission protocol that communicates using short-wavelength ultra-high frequency (UHF) radio waves in the 2.4 GHz industrial, scientific, and medical (ISM) frequency band, a plain old telephone service (POTS), a Voice over Internet Protocol (VoIP) service, a video calling service, a video chat service, a cellular telephone service, a wireless calling service, and an audio messaging service.

In block 706, an indication of the request may be provided to a user through a manager. In block 708, a direction from the user to accept or reject the request may be obtained. In response to obtaining the direction to accept the request, the method may continue to block 710. In block 710, a request may be sent to the first software controller to place the first communication session on hold by sending a signal to the first transport medium, ceasing to send audio to the first transport medium, and ceasing to receive audio from the first transport medium. In block 712, a request may be sent to the second software controller to activate the second transport medium. In block 714, the second communication session may be established by sending an indication of acceptance to the second transport medium, starting to send audio to the second transport medium, and starting to receive audio from the second transport medium.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

As indicated above, the embodiments described herein may include the use of a special purpose or general purpose computer (e.g., the processor 410 of FIG. 4) including various computer hardware or software modules, as discussed in greater detail below. Further, as indicated above, embodiments described herein may be implemented using computer-readable media (e.g., the memory 412 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A user device comprising:
   at least one non-transitory computer readable media configured to store:
      first instructions for implementing a first software controller configured to directly interface with a first transport medium for voice communications that is a plain old telephone service;
      second instructions for implementing a second software controller configured to directly interface with a second transport medium for voice communications that is a Voice over Internet Protocol service; and
      third instructions for implementing a communication manager configured to direct the first software controller and the second software controller; and
   at least one processor coupled to the at least one non-transitory computer readable media, the processor configured to execute the first instructions, the second instructions, and the third instructions to cause or direct the user device to perform operations, the operations comprising:
      obtain a request to establish a voice communication session with a device;
      in response to the request, select the first software controller based on the request and a priority order among the first transport medium and the second transport medium, wherein both the first transport medium and the second transport medium are configured to handle the request to establish the voice communication session;
      direct the first software controller to establish the voice communication session based on the request through the first transport medium; and
      establish, by execution of the first instructions to implement the first software controller, the voice communication session with the device through the first transport medium.

2. The user device of claim 1, wherein the priority order is based on an availability of each of the first transport medium and the second transport medium, a cost to send, receive, or participate in voice communication sessions for each of the first transport medium and the second transport medium, and preferences of a user of the user device.

3. The user device of claim 1, wherein the device is associated with a contact stored in the user device, the contact including contact identification data, and the request, upon which selection of the first software controller is based, includes the contact identification data.

4. The user device of claim 3, wherein the contact identification data comprise one or more of the following: an identification number, a username, a phone number, and an email address.

5. The user device of claim 1, wherein the operations further comprise:
   in response to the request, determine an availability of the first transport medium and the second transport medium; and
   create the priority order among the first transport medium and the second transport medium based on the determined availability of the first transport medium and the second transport medium.

6. The user device of claim 1, wherein the operations further comprise:
   direct first audio obtained during the voice communication session from the first transport medium to a second device configured to broadcast the first audio; and
   direct second audio obtained during the voice communication session to the first transport medium for sending the second audio over the first transport medium to the device.

7. The user device of claim 1, wherein the operations further comprise:
   obtain, by execution of the second instructions to implement the second software controller, a request to establish a second communication session through the second transport medium;
   obtain input from a user to accept or reject the request to establish the second communication session; and
   in response to input to accept the request:
      direct, by way of the first software controller, the first transport medium to place the voice communication session on hold;
      activate the second transport medium by way of the second software controller; and
      establish the second communication session by sending an indication of acceptance to the second transport medium by way of the second software controller.

8. A method of communication, the method comprising:
   obtaining, at a user device, a request to establish a voice communication session with a device;
   in response to the request, selecting, by the user device, a first software controller configured to directly interface with a first transport medium for voice communications that is a plain old telephone service from among the first software controller and a second software controller configured to directly interface with a second transport medium for voice communications, both the first transport medium and the second transport medium being configured to handle the request to establish the voice communication session, the first and second software controllers installed and configured to run on the user device, the second transport medium being a Voice over Internet Protocol service, the selection of the first software controller based on the request and a priority order among the first transport medium and the second transport medium; and
   establishing, by the user device, the voice communication session with the device by the first software controller through the first transport medium.

9. The method of claim 8, wherein the priority order is based on an availability of each of the first transport medium and the second transport medium, a cost to send, receive, or participate in voice communication sessions for each of the first transport medium and the second transport medium, and preferences of a user of the user device.

10. The method of claim 8, wherein the device is associated with a contact, the contact including contact identification data, and the request, upon which selection of the first software controller is based, includes the contact identification data.

11. The method of claim 10, wherein the contact identification data comprise one or more of the following: an identification number, a username, a phone number, and an email address.

12. The method of claim 8, further comprising:
in response to the request, determining an availability of the first transport medium and the second transport medium; and
creating the priority order among the first transport medium and to the second transport medium based on the determined availability of the first transport medium and the second transport medium.

13. The method of claim 12, wherein the device is associated with a contact, the contact including contact identification data, and the request, upon which selection of the first software controller is based, includes the contact identification data.

14. The method of claim 8, further comprising:
obtaining a request to establish a second communication session through the second transport medium by way of the second software controller;
obtaining input from a user to accept or reject the request to establish the second communication session; and
in response to input to accept the request:
directing, by way of the first software controller, the first transport medium to place the voice communication session on hold;
activating the second transport medium by way of the second software controller; and
establishing the second communication session by sending an indication of acceptance to the second transport medium by way of the second software controller.

15. A user device comprising:
at least one non-transitory computer readable media configured to store:
first instructions for implementing a first software controller configured to directly interface with a first transport medium for voice communications that is a plain old telephone service;
second instructions for implementing a second software controller configured to directly interface with a second transport medium for voice communications that is a short-wavelength 2.4 GHz frequency band; and
third instructions for implementing a communication manager configured to direct the first software controller and the second software controller; and
at least one processor coupled to the at least one non-transitory computer readable media, the processor configured to execute the first instructions, the second instructions, and the third instructions to cause or direct the user device to perform operations, the operations comprising:
obtain a request to establish a voice communication session with a device;
in response to the request, select the first software controller based on the request and a priority order among the first transport medium and the second transport medium wherein both the first transport medium and the second transport medium are configured to handle the request to establish the voice communication session;
direct the first software controller to establish the voice communication session based on the request through the first transport medium; and
establish, by execution of the first instructions to implement the first software controller, the voice communication session with the device through the first transport medium.

16. The user device of claim 15, wherein the operations further comprise:
obtain a second request to establish a second communication session with a second device;
in response to the second request, select the second software controller based on the second request and the priority order among the first transport medium and the second transport medium;
direct the second software controller to establish the voice communication session based on the request through the second transport medium; and
establish, by execution of the second instructions to implement the second software controller, the second communication session with the second device through the second transport medium.

17. The user device of claim 16, wherein the device is the same as the second device.

18. The user device of claim 1, wherein
the operations further comprise:
obtain a second request to establish a second communication session with a second device;
in response to the second request, select the second software controller based on the second request and the priority order among the first transport medium and the second transport medium;
direct the second software controller to establish the voice communication session based on the request through the second transport medium; and
establish, by execution of the second instructions to implement the second software controller, the second communication session with the second device through the second transport medium.

19. The user device of claim 18, wherein the device is the same as the second device.

20. The method of claim 8, further comprising:
obtaining, at the user device, a second request to establish a second communication session with a second device;
in response to the request, selecting, by the user device, the second software controller configured to directly interface with the second transport medium, the selection of the second software controller based on the request and the priority order among the first transport medium and the second transport medium; and
establishing, by the user device, the second communication session with the second device by the second software controller through the second transport medium.

* * * * *